United States Patent
Ikawa

(10) Patent No.: US 9,071,800 B2
(45) Date of Patent: Jun. 30, 2015

(54) DISPLAY UNIT AND DISPLAYING METHOD FOR ENHANCING DISPLAY IMAGE QUALITY

(75) Inventor: Naoki Ikawa, Chiba (JP)

(73) Assignee: Sony Corporation, Tokyo (JP)

( * ) Notice: Subject to any disclaimer, the term of this patent is extended or adjusted under 35 U.S.C. 154(b) by 475 days.

(21) Appl. No.: 13/429,632

(22) Filed: Mar. 26, 2012

(65) Prior Publication Data

US 2012/0249617 A1  Oct. 4, 2012

(30) Foreign Application Priority Data

Apr. 1, 2011 (JP) .................................. 2011-081773

(51) Int. Cl.
| | |
|---|---|
| G09G 3/36 | (2006.01) |
| H04N 5/58 | (2006.01) |
| G09G 3/20 | (2006.01) |
| H04N 21/44 | (2011.01) |
| H04N 21/431 | (2011.01) |

(52) U.S. Cl.
CPC .............. H04N 5/58 (2013.01); G09G 3/2018 (2013.01); G09G 3/3648 (2013.01); G09G 2320/06 (2013.01); G09G 2290/00 (2013.01); H04N 21/44008 (2013.01); H04N 21/4318 (2013.01)

(58) Field of Classification Search
CPC .................................. G09G 3/34; G09G 3/36
USPC ......................................................... 345/102
See application file for complete search history.

(56) References Cited

U.S. PATENT DOCUMENTS

| | | | | |
|---|---|---|---|---|
| 2004/0114396 A1* | 6/2004 | Kobayashi et al. | ........... | 362/561 |
| 2004/0246374 A1* | 12/2004 | Mishima et al. | ............... | 348/441 |
| 2005/0057484 A1* | 3/2005 | Diefenbaugh et al. | ........ | 345/102 |
| 2006/0044472 A1* | 3/2006 | Lee et al. | ....................... | 348/607 |
| 2006/0202945 A1* | 9/2006 | Feng | .............................. | 345/102 |
| 2008/0068359 A1* | 3/2008 | Yoshida et al. | ................ | 345/204 |
| 2008/0069478 A1* | 3/2008 | Ohwaki et al. | ................ | 382/300 |
| 2008/0158212 A1* | 7/2008 | Maruyama et al. | ........... | 345/208 |
| 2008/0284719 A1* | 11/2008 | Yoshida | ......................... | 345/102 |
| 2008/0284768 A1* | 11/2008 | Yoshida et al. | ............... | 345/208 |
| 2008/0284931 A1* | 11/2008 | Kimura | ........................... | 349/39 |
| 2009/0022411 A1* | 1/2009 | Inoue et al. | .................... | 382/239 |
| 2010/0103089 A1* | 4/2010 | Yoshida et al. | ............... | 345/102 |
| 2010/0201719 A1* | 8/2010 | Kimura | ........................ | 345/690 |
| 2010/0289944 A1* | 11/2010 | Chen et al. | .................... | 348/441 |
| 2011/0050748 A1* | 3/2011 | Tsuchiya et al. | .............. | 345/690 |
| 2011/0267384 A1* | 11/2011 | Fujiwara et al. | .............. | 345/690 |
| 2012/0092388 A1* | 4/2012 | Kamon | ......................... | 345/690 |
| 2012/0162289 A1* | 6/2012 | Oniki | ............................ | 345/690 |

FOREIGN PATENT DOCUMENTS

JP  2008-268436 A  11/2008

* cited by examiner

*Primary Examiner* — Claire X Pappas
*Assistant Examiner* — Robert Stone
(74) *Attorney, Agent, or Firm* — Sony Corporation

(57) ABSTRACT

A display unit includes: a liquid crystal display section displaying a series of original frame images and a series of interpolated frame images in a time-divisional manner, the interpolated frame images being generated based on the original frame images; a backlight emitting light intermittently; and a backlight control section controlling a first light-emission amount and a second light-emission amount of the backlight independently of each other, the first light-emission amount being an amount during a first period corresponding to a period for displaying the original frame images, and the second light-emission amount being an amount during a second period corresponding to a period for displaying the interpolated frame images.

12 Claims, 17 Drawing Sheets

FIG. 2A
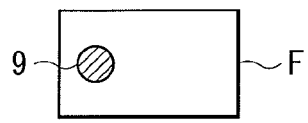
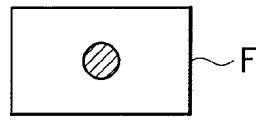
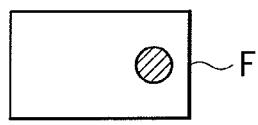
FIG. 2B
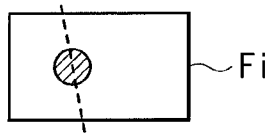
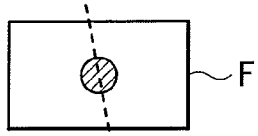
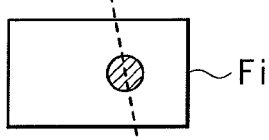
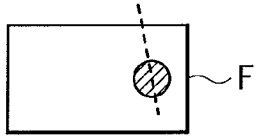

DISPLAY UNIT AND DISPLAYING METHOD FOR ENHANCING DISPLAY IMAGE QUALITY

CROSS-REFERENCE TO RELATED APPLICATION

The present application claims priority from Japanese Patent Application No. JP 2011-081773 filed in the Japanese Patent Office on Apr. 1, 2011, the entire content of which is incorporated herein by reference.

BACKGROUND

The present disclosure is related to a display unit using liquid crystal display devices, and a displaying method thereof.

A display unit such as a television receiver displays successive still images sequentially based on video signals composed of those successive still images. Herewith, on the display unit, for example, when the successive still images are derived by sampling a smoothly moving object (a body in motion), a movement of the body in motion is reproduced artificially by displaying the successive still images sequentially.

Meanwhile, when a person performs a follow-up observation (follow-up viewing) of a moving object in the natural world, he or she observes such a body in motion by moving a head, eyeballs, or the like smoothly. In such a manner, the body in motion is imaged at the center of retinas of eyeballs. When a display unit displays a body in motion, the body in motion on a screen moves discontinuously due to successive still images being displayed sequentially. It is known that, even in such a case, a person views that the body in motion is moving continuously and smoothly, observing the body in motion while following it smoothly.

In recent years, a liquid crystal display unit that has been served as a main force of the display unit is so-called a hold-type display unit. More specifically, such a display unit keeps displaying the same image during a single frame period between intervals from a display cycle of one still image until the next display cycle of another still image. As a result, in viewing a body in motion that is displayed on such a display unit, an observer attempts to observe the body in motion while following it smoothly, and thus an image on the retina moves to come across a center of the retina during a single frame period (slip of retina image). Consequently, in viewing a motion video on such a display unit, so-called a hold-blur occurs, and an observer feels as if the image quality would deteriorate.

Several considerations have been given concerning methods to improve such a hold-blur. For example, Japanese Unexamined Patent Application Publication No. 2008-268436 discloses a liquid crystal display unit that drives a backlight in a blinking state and shortens a slip length of a retina image by reducing a hold-display time of an image, thereby reducing a hold-blur.

SUMMARY

Meanwhile, there is a need for further improvement of the display image quality for a display unit. However, Japanese Unexamined Patent Application Publication No. 2008-268436 is silent with regard to further improvement of the display image quality.

It is desirable to provide a display unit and a displaying method that are capable of enhancing the display image quality.

A first display unit according to an embodiment of the present disclosure includes: a liquid crystal display section displaying a series of original frame images and a series of interpolated frame images in a time-divisional manner, the interpolated frame images being generated based on the original frame images; a backlight emitting light intermittently; and a backlight control section controlling a first light-emission amount and a second light-emission amount of the backlight independently of each other, the first light-emission amount being an amount during a first period corresponding to a period for displaying the original frame images, and the second light-emission amount being an amount during a second period corresponding to a period for displaying the interpolated frame images.

A second display unit according to an embodiment of the present disclosure includes: a display section displaying a series of original frame images and a series of interpolated frame images in a time-divisional manner, the interpolated frame images being generated based on the original frame images; and a display control section controlling the display section to allow a light-emission amount of the display section during a period for displaying the original frame images to be a first total light-emission amount, and controlling the display section to allow a light-emission amount of the display section during a period for displaying the interpolated frame images to be a second total light-emission amount, the first total light-emission amount being defined as a sum of a first basic light-emission amount corresponding to image information of the original frame images and a first offset light-emission amount, the second total light-emission amount being defined as a sum of a second basic light-emission amount corresponding to image information of the interpolated frame images and a second offset light-emission amount. The display control section controls the first offset light-emission amount and the second offset light-emission amount independently of each other.

A method of displaying according to an embodiment of the present disclosure includes: displaying, on a liquid crystal display section, a series of original frame images and a series of interpolated frame images in a time-divisional manner, the interpolated frame images being generated based on the original frame images; and allowing a backlight to emit light intermittently. The allowing the backlight to emit the light intermittently includes controlling a first light-emission amount and a second light-emission amount of a backlight independently of each other, the first light-emission amount being an amount during a first period corresponding to a period for displaying the original frame images, and the second light-emission amount being an amount during a second period corresponding to a period for displaying the interpolated frame images.

In the first display unit and the displaying method according to the embodiments of the present disclosure, the original frame images and the interpolated frame images are displayed on the liquid crystal display section in a time-divisional manner, and the backlight emits light intermittently in synchronization with such a display operation. At this time, on the backlight, the first light-emission amount and the second light-emission amount are controlled independently of each other.

On the second display unit according to the embodiment of the present disclosure, the original frame images and the interpolated frame images are displayed on the display section in a time-divisional manner. At this time, on the display section, the first light-emission amount and the second light-emission amount are controlled independently of each other.

In the first and the second display units as well as the displaying method according to the embodiments of the present disclosure, since the first light-emission amount and the second light-emission amount are controlled independently of each other, it is possible to enhance the display image quality.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the present disclosure, and are incorporated in and constitute a part of this specification. The drawings illustrate embodiments and, together with the specification, serve to explain the principles of the present technology.

FIGS. 2A and 2B are pattern diagrams each showing an operation example of an interpolation processing section shown in FIG. 1.

DETAILED DESCRIPTION OF THE PREFERRED EMBODIMENTS

Hereinafter, the embodiments of the present disclosure are described in details with reference to the drawings. It is to be noted that the descriptions are provided in order given below.
1. First Embodiment
2. Second Embodiment
3. Third Embodiment 1. First Embodiment

[Configuration Example]
(Overall Configuration Example)

Figure 1:
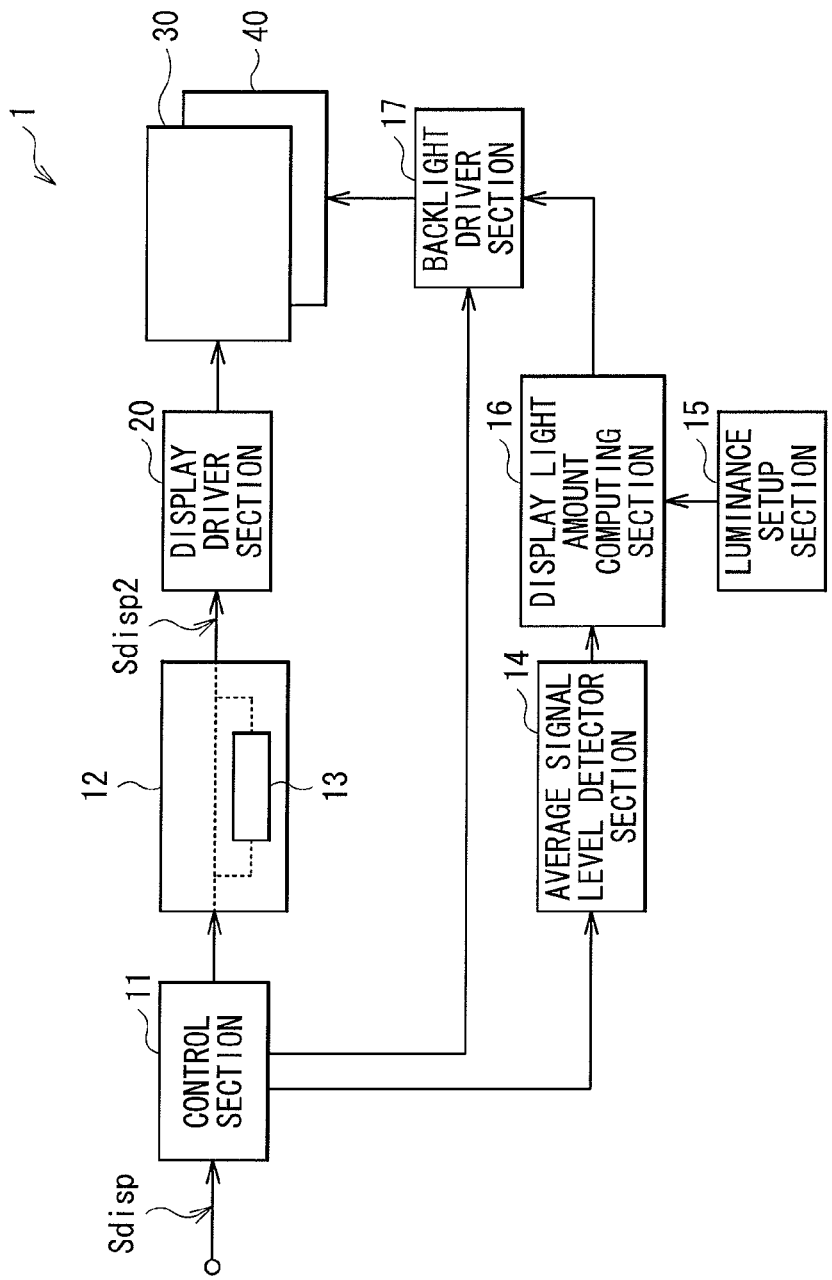
FIG. 1 is a block diagram showing a configuration example of a display unit according to a first embodiment of the present disclosure.

FIG. 1 shows a configuration example of a display unit according to a first embodiment of the present disclosure. It is to be noted that a displaying method according to an embodiment of the present disclosure is also described in addition because such a method is embodied with this embodiment of the present disclosure.

A display unit 1 includes a control section 11, an interpolation processing section 12, a display driver section 20, a liquid crystal display section 30, an average signal level detector section 14, a luminance setup section 15, a display light amount computing section 16, a backlight driver section 17, and a backlight 40.

The control section 11 is a circuit that is based on a video signal Sdisp for controlling the interpolation processing section 12, the average signal level detector section 14, and the backlight driver section 17 to operate in synchronization with each other. Specifically, as described later, the control section 11 provides the video signal Sdisp and a control signal to the interpolation processing section 12, and delivers the control signal to the backlight driver section 17, while providing the video signal Sdisp and the control signal to the average signal level detector section 14.

The interpolation processing section 12 performs a time-series interpolation processing based on a frame image F included in the video signal Sdisp to generate a video signal Sdisp2. The interpolation processing section 12 has an interpolated image generating section 13. The interpolated image generating section 13 generates an interpolated frame image Fi based on two frame images F adjoining with one another in chronological order. Thereafter, the interpolation processing section 12 generates the video signal Sdisp2 by inserting an interpolated frame image Fi generated by the interpolated image generating section 13 between two frame images F adjoining with one another.

FIGS. 2A and 2B each show a pattern diagram of an interpolation process in the interpolation processing section 12, wherein FIG. 2A illustrates images before the interpolation processing is performed, while FIG. 2B illustrates images after the interpolation processing is performed. The interpolation processing section 12 generates a series of frame images by inserting each of interpolated frame images Fi generated by the interpolated image generating section 13 between successive still images (frame images F) included in the video signal Sdisp (FIG. 2B). As a result of such an interpolation processing, for example, in case of an image in which a ball 9 moves from left to right as shown in FIG. 2A, the ball 9 is viewed to move from left to right more smoothly as shown in FIG. 2B.

The display driver section 20 drives the liquid crystal display section 30 on the basis of the video signal Sdisp2 provided from the interpolation processing section 12. The liquid crystal display section 30 is a display section composed of liquid crystal display devices, performing a display by modulating light emitted from the backlight 40.

Figure 3:
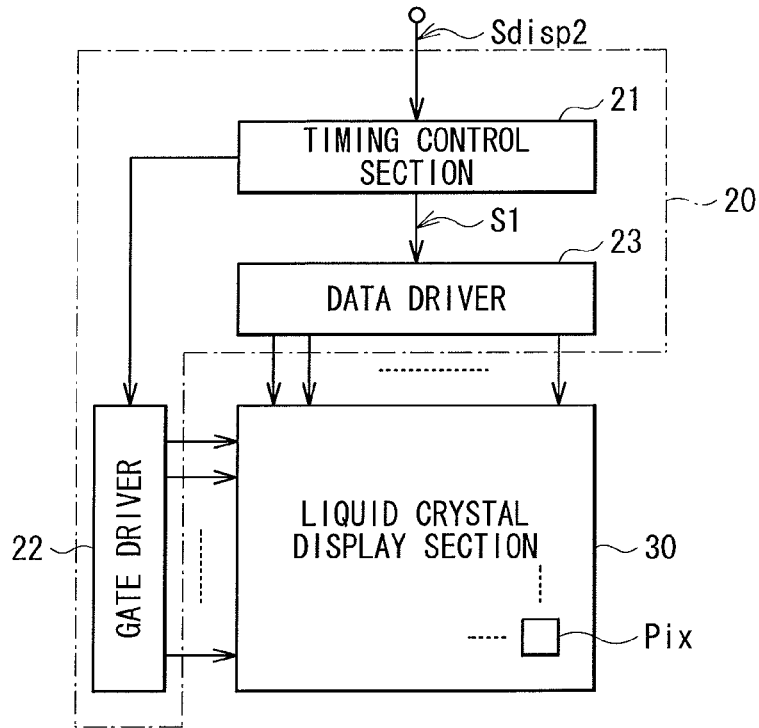
FIG. 3 is a block diagram showing a configuration example of a display driver section and a liquid crystal display section shown in FIG. 1.

FIG. 3 shows an example of a block diagram for the display driver section 20 and the liquid crystal display section 30. The display driver section 20 includes a timing control section 21, a gate driver 22, and a data driver 23. The timing control section 21 controls a drive timing for the gate driver 22 and the data driver 23, while providing the video signal Sdisp2 delivered from the interpolation processing section 12 to the data driver 23 as a video signal S1. The gate driver 22 sequentially selects pixels Pix within the liquid crystal display section 30 for each row for sequential line scanning under a timing control performed by the timing control section 21. The data driver 23 provides a pixel signal based on the video signal S1 to each of the pixels Pix within the liquid crystal display section 30. Specifically, the data driver 23 generates the pixel signal in an analog signal form by performing D/A (digital/analog) conversion based on the video signal S1, providing the resultant pixel signal to each of the pixels Pix.

The liquid crystal display section 30 seals a liquid crystal material between two pieces of transparent substrates made of a material such as a glass. At portions facing the liquid crystal material on these transparent substrates, transparent electrodes made of a material such as ITO (Indium Tin Oxide) are formed to configure the pixels Pix along with the liquid crystal material. As shown in FIG. 3, the pixels Pix are arranged in a matrix pattern on the liquid crystal display section 30.

Figure 4:
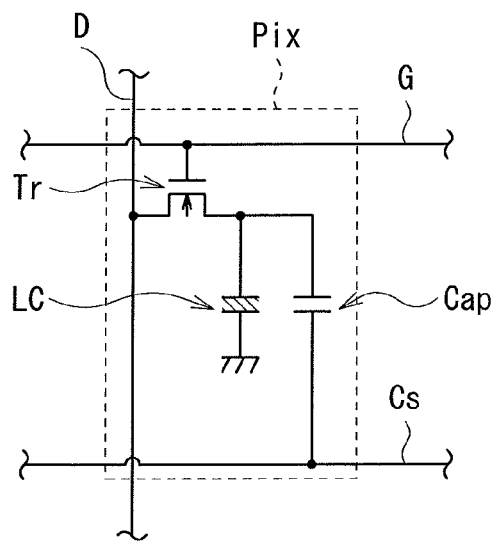
FIG. 4 is a circuit diagram showing a configuration example of a pixel shown in FIG. 3.

FIG. 4 shows an example of a circuit diagram for the pixel Pix. The pixel Pix includes a TFT (Thin Film Transistor) device Tr, a liquid crystal device LC, and a holding capacitor device Cap. The TFT device Tr is composed of, for example, a MOS-FET (Metal Oxide Semiconductor-Field Effect Transistor) with a gate connected to a gate line G, a source connected to a data line D, and a drain connected to a first end of the liquid crystal device LC and a first end of the holding capacitor device Cap, respectively. For the liquid crystal device LC, the first end is connected to the drain of the TFT device Tr, while a second end is grounded. For the holding capacitor device Cap, the first end is connected to the drain of the TFT device Tr, while a second end is connected to a holding capacitor line Cs. The gate line G is connected to the gate driver 22, and the data line D is connected to the data driver 23.

The average signal level detector section 14 determines an average signal level Savg of the video signal Sdisp in each frame image. The luminance setup section 15 allows a user to adjust and set up the luminance of a display screen on the display unit 1. Specifically, the luminance setup section 15 indicates adjustment menus concerning the luminance of a display screen using, for example, OSD (On Screen Display). A user adjusts and sets up the luminance following such menus, and the luminance setup section 15 holds the settings. On the luminance setup section 15, not only the luminance of a display screen but also all the items concerning the luminance of a display screen, such as contrast, color density, and gamma are set up, and luminance setup values are determined and held based on such settings.

The display light amount computing section 16 computes to determine an amount of light from a display screen (an amount of display light, or "display light amount" B) when each frame image is displayed on the display unit 1 in accordance with the average signal level Savg of each frame image that is determined by the average signal level detector section 14 and the luminance settings at the luminance setup section 15. In other words, since the average signal level Savg of each frame image that is determined by the average signal level detector section 14 corresponds to an average amount of light transmitting through the liquid crystal display section 30 in each frame image, this makes it possible for the display light amount computing section 16 to determine the display light amount B based on the average signal level Savg and luminance settings.

The backlight driver section 17 drives the backlight 40 to emit light intermittently in synchronization with a display on the liquid crystal display section 30 in accordance with the control signal provided from the control section 11 and a computation result of the display light amount B that is provided from the display light amount computing section 16. Specifically, as described later, the backlight driver section 17 drives the backlight 40 by controlling the luminance I during a period when the liquid crystal display section 30 displays the frame image F and the luminance Ii during a period when the liquid crystal display section 30 displays the interpolated frame image Fi, independently of each other.

The backlight 40 emits light intermittently (performs a blinking operation) based on a drive signal provided from the backlight driver section 17, and projects the light to the liquid crystal display section 30. The backlight 40 may be configured using, for example, an LED (Light Emitting Diode), although it is not limited thereto. The backlight 40 may be configured using a CCFL (Cold Cathode Fluorescent Lamp), alternatively.

Thereupon, the frame image F corresponds to a specific example of an "original frame image" in one embodiment of the present disclosure. The backlight driver section 17 corresponds to a specific example of a "backlight control section" in one embodiment of the present disclosure. The average signal level detector section 14 and the display light amount computing section 16 correspond to a specific example of a "computing section" in one embodiment of the present disclosure.

[Operation and Action]

Subsequently, an operation and action of the display unit 1 according to the embodiment of the present disclosure are described hereinafter.

[Overview of Overall Operation]

First, an overview of the overall operation of the display unit 1 is described with reference to FIG. 1 to FIG. 4. The control section 11, based on the video signal Sdisp, controls the interpolation processing section 12, the average signal level detector section 14, and the backlight driver section 17 to operate in synchronization with each other. The interpolation processing section 12 performs a time-series interpolation processing based on the frame image F included in the video signal Sdisp to generate the video signal Sdisp2. The display driver section 20 drives the liquid crystal display section 30. The liquid crystal display section 30 performs a display by modulating light emitted from the backlight 40.

The average signal level detector section 14 determines the average signal level Savg of the video signal Sdisp in each frame image. The luminance setup section 15 sets up the luminance of a display screen on the display unit 1 on the basis of an instruction from a user. The display light amount computing section 16 computes to determine the amount of light from a display screen (display light amount B) when each frame image is displayed on the display unit 1. The backlight driver section 17 drives the backlight 40 to emit light intermittently in synchronization with a display on the liquid crystal display section 30. Specifically, the backlight driver section 17 drives the backlight 40 by controlling the luminance I during a period when the liquid crystal display section 30 displays the frame image F and the luminance Ii during a period when the liquid crystal display section 30 displays the interpolated frame image Fi, independently of each other. The backlight 40 emits light based on a drive signal provided from the backlight driver section 17, and projects the light to the liquid crystal display section 30.

(Detailed Operation)

Figure 5:
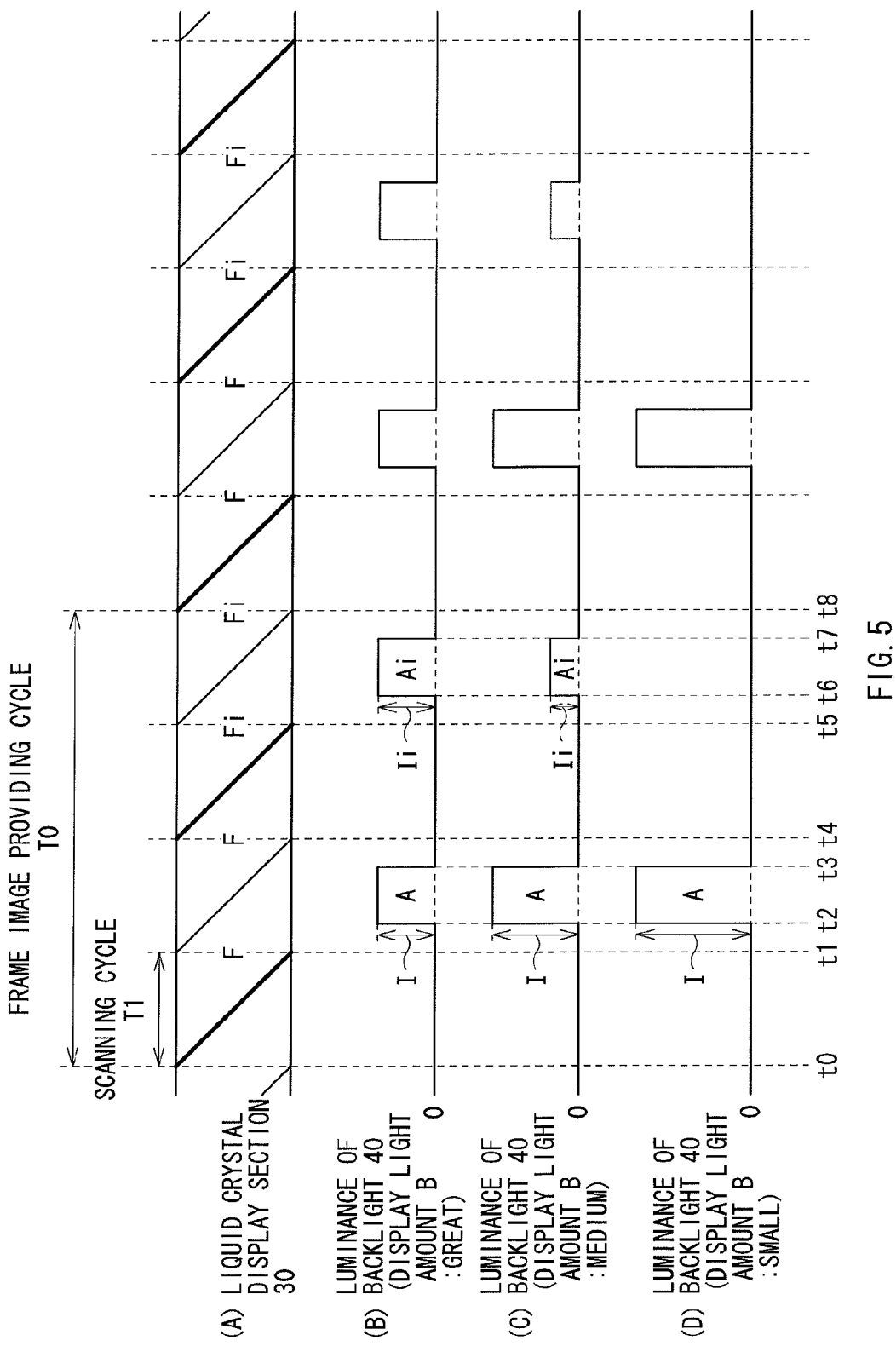
FIG. 5 is a timing waveform diagram showing an operation example of the display unit shown in FIG. 1.

FIG. 5 shows a timing diagram of the display operation in the display unit 1, wherein (A) illustrates the operation of the liquid crystal display section 30, while (B) to (D) illustrate the luminance on the backlight 40. Hereupon, (B) shows the luminance on the backlight 40 when the display light amount B is great, and (C) shows the luminance on the backlight 40 when the display light amount B is medium, while (D) shows the luminance on the backlight 40 when the display light amount B is small.

A vertical axis in (A) of FIG. 5 denotes a scanning position in the sequential line scanning direction of the liquid crystal display section 30. In (A) of FIG. 5, "F" denotes a state where the liquid crystal display section 30 is performing a display of the frame image F, while "Fi" denotes a state where the liquid crystal display section 30 is performing a display of the interpolated frame image Fi.

On the display unit 1, the sequential line scanning is carried out at a scanning timing cycle T1 with a display of the frame image F and a display of the interpolated frame image Fi being performed alternately. The display unit 1 repeats such a display cycle for each timing cycle T0. The timing cycle T0 corresponds to a timing cycle during which the frame image F is provided in the video signal Sdisp provided externally (frame image providing cycle). Here, the timing cycle T0 may be set up, for example, at 16.7 [msec] (a single timing cycle of 60 [Hz]). In this case, the scanning timing cycle T1 is 4.2 [msec] (a quarter of the timing cycle T0). More specifically, in this example, the liquid crystal display section 30 is a liquid crystal display panel corresponding to so-called a quad-speed drive.

The display unit 1 carries out a display scanning of the frame image F during a timing period t0 to t4.

First, during a timing period t0 to t1, the liquid crystal display section 30 carries out the sequential line scanning from the uppermost part toward the lowermost part based on a control signal provided from the display driver section 20 to display the frame image F ((A) of FIG. 5). During the timing period t0 to t1, the backlight 40 turns off ((B) to (D) of FIG. 5).

Next, during a timing period t1 to t4, the liquid crystal display section 30 carries out the sequential line scanning from the uppermost part toward the lowermost part to display the frame image F once again ((A) of FIG. 5). More specifically, in this example, a display of the frame image F is repeated twice during the timing period t0 to t4. Then, during a timing period t2 to t3 after a response of the liquid crystal device LC is almost completed on the liquid crystal display section 30, the backlight driver section 17 drives the backlight 40 to emit light with the luminance I corresponding to the display light amount B determined by the display light amount computing section 16 ((B) to (D) of FIG. 5). In concrete terms, the backlight 40 emits light with low luminance I when the display light amount B is great ((B) of FIG. 5), while emitting light with high luminance I when the display light amount B is small ((D) of FIG. 5).

Figure 6:
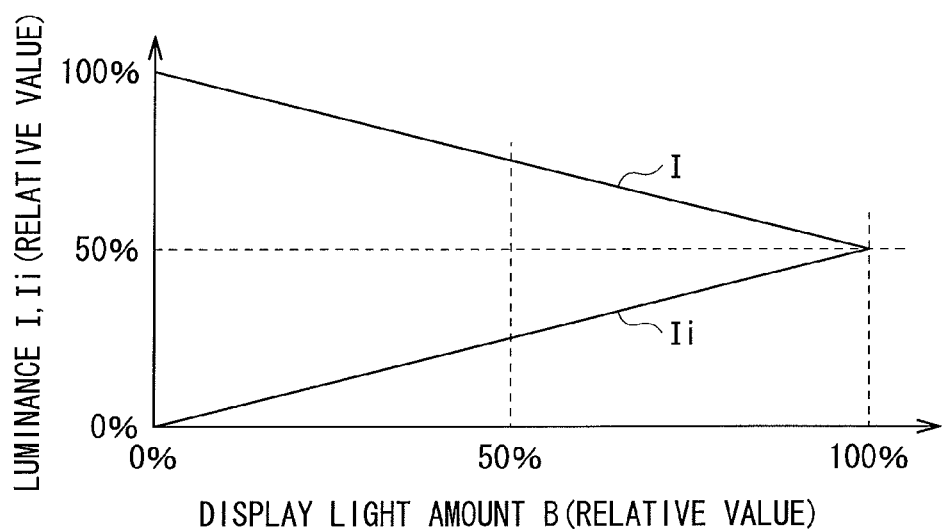
FIG. 6 is a characteristic diagram showing a characteristic example of a backlight driver section shown in FIG. 1.

FIG. 6 shows a characteristic example of the backlight driver section 17. In FIG. 6, a horizontal axis indicates relative values of the display light amount B, while a vertical axis indicates relative values of the luminance I and Ii. In this figure, "100%" of the display light amount B denotes that the liquid crystal display section 30 is placed in a transparent state (white display state) over a whole area, corresponding to the case where the luminance of the backlight 40 is maximum. On the other hand, "0%" of the display light amount B denotes that the liquid crystal display section 30 is placed in a shutoff state (black display state) over a whole area.

As shown in FIG. 6, the luminance I decreases as the display light amount B becomes greater. Specifically, the luminance I becomes a maximum value (100%) when the display light amount B is 0%. The luminance I decreases as the display light amount B becomes greater, and becomes a half of the maximum value (50%) when the display light amount B is 100%. It is to be noted that (B) of FIG. 5 shows a case where the display light amount B is 100%, and (C) of FIG. 5 shows a case where the display light amount B is 50%, while (D) of FIG. 5 shows a case where the display light amount B is 0%.

In such a manner, the backlight driver section 17 drives the backlight 40 to emit light with the luminance I corresponding to the display light amount B during the timing period t2 to t3 in accordance with the characteristics as shown in FIG. 6. As a result, the backlight 40 projects light of a light-emission amount A with the luminance I integrated during the timing period t2 to t3.

Subsequently, during a timing period t4 to t5, the liquid crystal display section 30 carries out the sequential line scanning from the uppermost part toward the lowermost part based on the control signal provided from the display driver section 20 to display the interpolated frame image Fi ((A) of FIG. 5). During the timing period t4 to t5, the backlight 40 turns off ((B) to (D) of FIG. 5). Therefore, an observer views no transient change from a display of the frame image F to a display of the interpolated frame image Fi on the liquid crystal display section 30 (transient response of the liquid crystal device LC), which makes it possible to reduce deterioration in the image quality.

Thereafter, during a timing period t5 to t8, the liquid crystal display section 30 carries out the sequential line scanning from the uppermost part toward the lowermost part to display the interpolated frame image Fi once again ((A) of FIG. 5). More specifically, in this example, a display of the interpolated frame image Fi is repeated twice during the timing period t4 to t8. Then, during a timing period t6 to t7 after a response of the liquid crystal device LC is almost completed on the liquid crystal display section 30, the backlight driver section 17 drives the backlight 40 to emit light with the luminance Ii corresponding to the display light amount B determined by the display light amount computing section 16 ((B) to (D) of FIG. 5). In concrete terms, the backlight 40 emits light with higher luminance Ii as the display light amount B is greater.

As shown in FIG. 6, the luminance Ii increases as the display light amount B becomes greater. Specifically, the luminance Ii becomes a minimum value (0%) when the display light amount B is 0%. That is, in this case, the backlight 40 turns off. The luminance Ii increases as the display light amount B becomes greater, and becomes a half of the maximum value (50%) when the display light amount B is 100%.

In such a manner, the backlight driver section 17 drives the backlight 40 to emit light with the luminance Ii corresponding to the display light amount B during the timing period t6 to t7 in accordance with the characteristics as shown in FIG. 6. As a result, the backlight 40 projects light of a light-emission amount Ai with the luminance Ii integrated during the timing period t6 to t7.

By repeating the above operation sequence, the display unit 1 repeats a display of the frame image F and a display of the interpolated frame image Fi alternately.

The display unit 1 shortens a single frame period by performing the interpolation processing, while driving the backlight 40 in a blinking state, thereby allowing to reduce a hold-display time of images and a hold-blur. Further, since the backlight 40 is configured to turn off in the event of a transient change in a displayed image on the liquid crystal display section 30, an observer views no transient response of the liquid crystal device LC, which assures to obtain apparently the same advantageous effect as the improvement of a response speed of the liquid crystal device LC.

Further, on the display unit 1, the backlight driver section 17 controls the luminance I (light-emission amount A) of the backlight 40 at the time of display of the frame image F and the luminance Ii (light-emission amount Ai) of the backlight 40 at the time of display of the interpolated frame image Fi independently of each other in accordance with the display light amount B. As described later, this makes it possible to reduce flickering when flickering is conspicuous, as well as deterioration in the image quality that is caused due to any interpolation error arising at the time of generation of the interpolated frame image Fi. Details are described later as compared with a comparative example.

Moreover, on the display unit 1, the light-emission amounts A and Ai are varied depending on the luminance I and the luminance Ii, and thus there is no change in the light-emitting timing of the backlight 40. As a result, during the timing cycle T0, any timing for displaying the frame image F and the interpolated frame image Fi is not changed due to the display light amount B. For example, in the event of variation in the timing for displaying the frame image F and the interpolated frame image Fi, as shown in FIG. 2 as an example, even if the interpolated frame image Fi is a just mid-timing image between the adjacent frame image F, any timing for displaying the interpolated frame image Fi is shifted, causing images not to be displayed smoothly. This may lead to a disadvantage that an observer becomes aware of deterioration in the image quality. On the other hand, there is no change in any timing for displaying the frame image F and the interpolated frame image Fi on the display unit 1. This allows to reduce the possibilities that an observer becomes aware of deterioration in the image quality.

Further, on the display unit 1, as shown in FIG. 6, the backlight driver section 17 drives the backlight 40 so that the luminance I decreases and the luminance Ii increases as the display light amount B becomes greater. At this time, the backlight driver section 17 drives the backlight 40 to maintain the sum of the luminance I and the luminance Ii at a constant value independently of the display light amount B. This makes the light-emission amounts (sum of the light-emission amount A and the light-emission amount Ai) during each timing cycle T0 of the backlight 40 constant irrespective of the display light amount B. Therefore, it is possible to reduce the possibilities that an observer finds a display image unnatural.

Next, the description is provided on an operation of the backlight driver section 17 in changing the luminance I and the luminance Ii of the backlight 40.

The backlight driver section 17 drives and controls the backlight 40 so that the luminance I and the luminance Ii may be varied accordingly when the display light amount B is changed with variation in the average signal level Savg of the video signal Sdisp. At this time, the backlight driver section 17 drives the backlight 40 so that the luminance I and the luminance Ii may be varied gradually.

Figure 7:
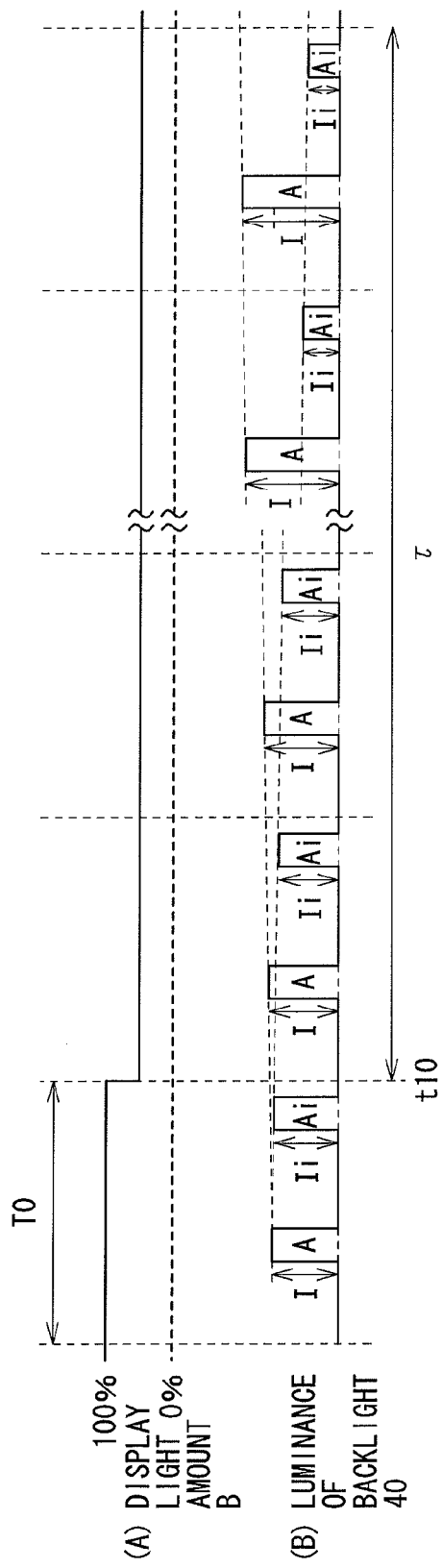
FIG. 7 is a timing waveform diagram showing another operation example of the display unit shown in FIG. 1.

FIG. 7 shows a variation in the luminance of the backlight 40 when the display light amount B is changed, wherein (A) denotes the display light amount B, while (B) denotes the luminance I and the luminance Ii of the backlight 40. This example illustrates a case where the display light amount B is changed from 100% to 50%. In other words, FIG. 7 shows case where the luminance of the backlight 40 is changed from a state in (B) of FIG. 5 to a state in (C) of FIG. 5.

When the display light amount B is 100%, the backlight driver section 17 drives the backlight 40 so that the luminance I and the luminance Ii of the backlight 40 may become the same. Then, after the display light amount B is changed to 50% at a timing t10 ((A) of FIG. 7), the backlight driver section 17 drives the backlight 40 so that the luminance I increases gradually and the luminance Ii decreases gradually ((B) of FIG. 7). More specifically, the backlight driver section 17 performs a control operation so that the luminance I and the luminance Ii may not be changed rapidly in response to variation in the display light amount B. A time (time constant) required for the luminance I and the luminance Ii to become final values may be set up at about one second for example. Because such a setting prevents a rapid change in the luminance I and the luminance Ii, it is possible to reduce the possibilities that an observer finds a display image unnatural.

(Comparative Example)

Next, an action according to the embodiment of the present disclosure is described as compared with a comparative example. This comparative example displays only the provided frame image F without generating the interpolated frame image Fi. It is to be noted that any component parts essentially same as the display unit 1 according to the embodiment of the present disclosure are denoted with the same reference numerals, and the related descriptions are omitted as appropriate.

Figure 8:
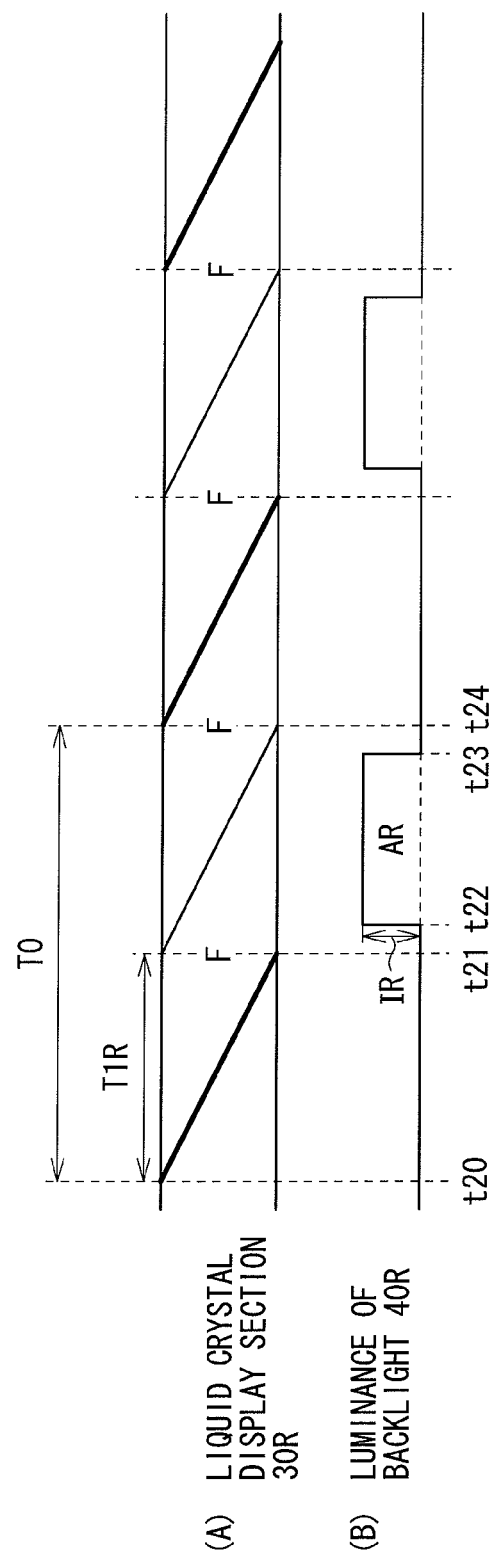
FIG. 8 is a timing waveform diagram showing an operation example of a display unit according to a comparative example.

FIG. 8 shows a timing diagram of display operation in a display unit 1R according to this comparative example, wherein (A) denotes an operation of a liquid crystal display section 30R, while (B) denotes the luminance of a backlight 40R on the display unit 1R.

The display unit 1R carries out the sequential line scanning at a scanning timing cycle T1, and displays the provided frame image F twice repeatedly at a timing cycle T0. In other words, the display unit 1R displays only the frame image F without performing the interpolation processing. Here, the timing cycle T0 may be set up, for example, at 16.7 [msec] (a single timing cycle of 60 [Hz]). In this case, the scanning timing cycle T1 is 8.3 [msec] (a half of the timing cycle T0). More specifically, in this example, the liquid crystal display section 30R is a liquid crystal display panel corresponding to so-called a double-speed drive.

First, during a timing period t20 to t21, the liquid crystal display section 30R carries out the sequential line scanning from the uppermost part toward the lowermost part based on a control signal provided from the display driver section 20 to display the frame image F ((A) of FIG. 8). During the timing period t20 to t21, the backlight 40R turns off ((B) of FIG. 8).

Next, during a timing period t21 to t24, the liquid crystal display section 30R carries out the sequential line scanning from the uppermost part toward the lowermost part to display the frame image F once again ((A) of FIG. 8). Then, during a timing period t22 to t23 after a response of the liquid crystal device LC is almost completed on the liquid crystal display section 30R, the backlight 40R emits light with a given luminance IR.

Since no interpolation processing is carried out on the display unit 1R according to this comparative example, images may become discontinuous as shown in FIG. 2A for example as compared with a case where the interpolation processing is performed (FIG. 2B), causing a disadvantage that an observer feels as if the image quality would deteriorate. Further, on the display unit 1R, the backlight 40R emits light only during the timing period t22 to t23 for a timing cycle T0, and turns off during any other timing periods. In other words, on the display unit 1R, images are displayed while blinking at longer cycle (lower frequency) than a case of the display unit 1 according to the embodiment of the present disclosure, and thus there is a disadvantage that an observer may become aware of flickering.

If an image blinking frequency decreases below a given frequency (flicker detection frequency), a viewer may feel flickering when observing such an image. Although the flicker detection frequency is generally in the order of 75 Hz, it may vary depending on a position or area of an image on the retina, personal difference such as age of a viewer, a physical condition of a viewer, brightness of an image, and brightness of an image viewing environment. For the brightness of an image, the flicker detection frequency increases when an image is bright, which makes a viewer feel flickering more easily.

In an example shown in FIG. 8, a blinking frequency of the backlight 40R is 60 [Hz] when a frame image providing timing cycle T0 is 16.7 [msec] (=1/60 [Hz]). Therefore, a bright image is displayed, and it is more likely that an observer feels flickering as the flicker detection frequency increases above 60 [Hz].

In contrast, on the display unit 1 according to the embodiment of the present disclosure, when a bright image is displayed (the display light amount B is great), as shown in (B) of FIG. 5, the backlight 40 emits light twice (during the timing periods t2 to t3 and t6 to t7) for the timing cycle T0, increasing a blinking frequency. Specifically, the blinking frequency of the backlight 40 is 120 [Hz] when the frame image providing timing cycle T0 is 16.7 [msec] (=1/60 [Hz]). Therefore, it is possible to reduce the possibilities that an observer may become aware of flickering.

When an image is dark (the display light amount B is small), the flicker detection frequency decreases, which makes it difficult for a viewer to feel flickering. On the display unit 1 according to the embodiment of the present disclosure, therefore, if a dark image is displayed (the display light amount B is small), as shown in (D) of FIG. 5, the backlight 40 emits light only when the liquid crystal display section 30 displays the frame image F, and turns off when the liquid crystal display section 30 displays the interpolated frame image Fi. With such an arrangement, even if any interpolation error should occur in generating the interpolated frame image Fi in the interpolation processing, the backlight 40 emits no light while the interpolated frame image Fi is displayed. As a result, an observer views no interpolated frame image Fi, which makes it possible to reduce the disadvantage that an observer may become aware of deterioration in the image quality.

Further, when an image brightness is medium (the display light amount B is medium), as shown in (C) of FIG. 5, the backlight 40 emits light with the luminance I when the liquid crystal display section 30 displays the frame image F, and emits light with the luminance Ii lower than the luminance I when the liquid crystal display section 30 displays the interpolated frame image Fi. This increases the blinking frequency, making it difficult for an observer to feel flickering. In addition, the interpolated frame image Fi is displayed with lower luminance Ii, which makes it difficult for an observer to become aware of deterioration in the image quality in the event of any interpolation error.

[Advantageous Effects]

As described above, according to the embodiment of the present disclosure, it is possible to control the luminance of the backlight at the time of display of the frame image and the luminance of the backlight at the time of display of the interpolated frame image independently of each other. Therefore, a degree of freedom for adjustment of the display image quality is allowed to be enhanced.

Further, according to the embodiment of the present disclosure, when the display light amount is great, the luminance of the backlight at the time of display of the frame image and the luminance of the backlight at the time of display of the interpolated frame image are made to be almost the same, which allows to reduce the disadvantage that an observer may become aware of flickering.

In addition, according to the embodiment of the present disclosure, when the display light amount is small, the luminance of the backlight at the time of display of the interpolated frame image is reduced. Therefore, even if any interpolation error should occur in generating the interpolated frame image, it is possible to reduce the possibilities that an observer may feel as if the image quality would deteriorate.

Moreover, according to the embodiment of the present disclosure, a light-emission amount is changed using the luminance, and thus there is no change in the light-emitting timing of the backlight. Therefore, it is possible to reduce the possibilities that an observer may feel as if the image quality would deteriorate.

Further, according to the embodiment of the present disclosure, when the display light amount is changed, the luminance of the backlight at the time of display of the frame image and the luminance of the backlight at the time of display of the interpolated frame image are changed gradually, and thus rapid variation in these luminances is avoided. Therefore, it is possible to reduce the possibilities that an observer may find the display image unnatural.

Additionally, according to the embodiment of the present disclosure, the sum of the luminance of the backlight at the time of display of the frame image and the luminance of the backlight at the time of display of the interpolated frame image is maintained constant independently of the display light amount. When the display light amount is changed, therefore, it is possible to reduce the possibilities that an observer may find the display image unnatural.

[Modification 1-1]

According to the embodiment of the present disclosure described above, a single piece of interpolated frame image Fi is generated based on the frame image F adjoining with one another in chronological order, although it is not limited thereto. Alternatively, two or more pieces of interpolated frame images Fi may be generated. As an example, a case where two pieces of interpolated frame images Fi (Fi1 and Fi2) are generated is described hereinafter.

Figure 9:
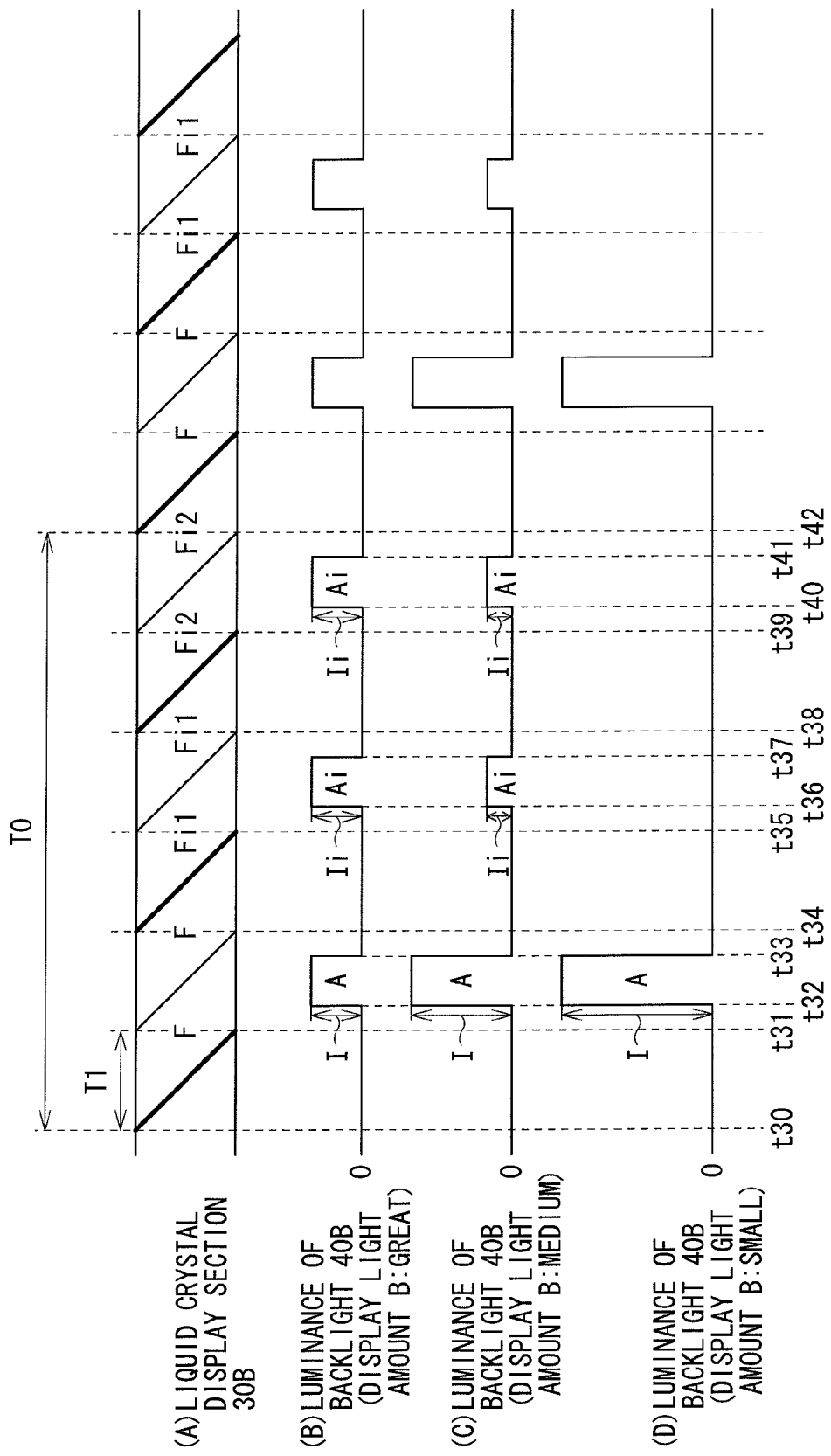
FIG. 9 is a timing waveform diagram showing an operation example of a display unit according to a modification for the first embodiment of the present disclosure.

FIG. 9 shows a timing diagram of the display operation for a display unit 1B according to this modification, wherein (A) denotes an operation of a liquid crystal display section 30B according to this modification, while (B) to (D) denote the luminance of a backlight 40B according to this modification. Hereupon, (B) shows the luminance on the backlight 40B when the display light amount B is great, and (C) shows the luminance on the backlight 40B when the display light amount B is medium, while (D) shows the luminance on the backlight 40B when the display light amount B is small.

On the display unit 1B, the sequential line scanning is carried out at a scanning timing cycle T1 with a display of the frame image F as well as a display of the interpolated frame image Fi1 and a display of the interpolated frame image Fi2 being switched. The display unit 1B repeats such a display cycle for each timing cycle T0. Here, the timing cycle T0 may be set up, for example, at 16.7 [msec] (a single timing cycle of 60 [Hz]). In this case, the scanning timing cycle T1 is 2.8 [msec] (a sixth of the timing cycle T0). More specifically, in this example, the liquid crystal display section 30B is a liquid crystal display panel corresponding to so-called a sixfold-speed drive.

On the display unit 1B, when the liquid crystal display section 30B displays the interpolated frame image Fi1, during a timing period t36 to t37 after a response of the liquid crystal device LC is almost completed on the liquid crystal display section 30B, the backlight 40B emits light with the luminance Ii corresponding to the display light amount B determined by the display light amount computing section 16. Further, when the liquid crystal display section 30B displays the interpolated frame image Fit, during a timing period t40 to t41 after a response of the liquid crystal device LC is almost completed on the liquid crystal display section 30B, the backlight 40B emits light with the same luminance as the luminance Ii during the timing period t36 to t37 ((B) to (D) of FIG. 9).

Figure 10:
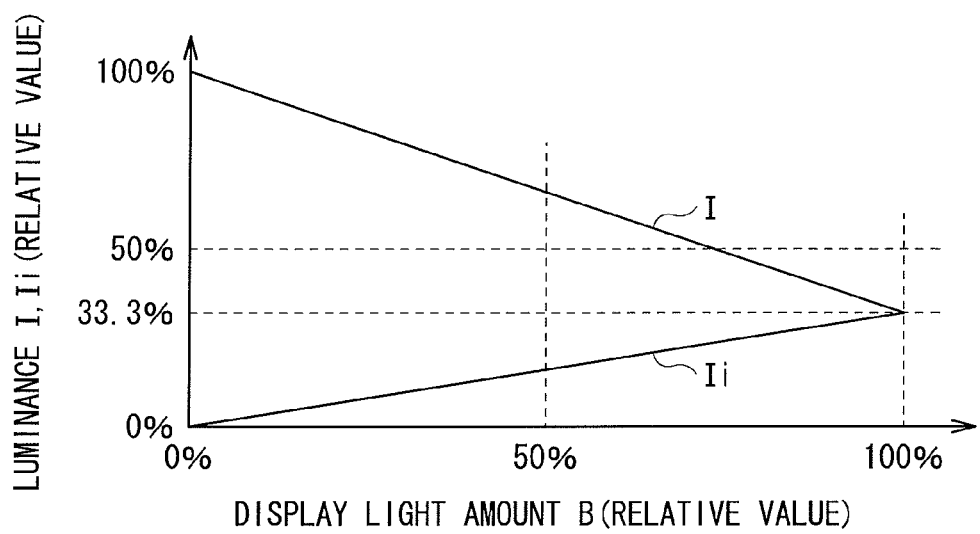
FIG. 10 is a characteristic diagram showing a characteristic example of the backlight driver section shown in FIG. 1.

FIG. 10 shows a characteristic example of the backlight driver section according to this modification. As shown in FIG. 10, the luminance I decreases as the display light amount B becomes greater. Specifically, the luminance I becomes a maximum value (100%) when the display light amount B is 0%. The luminance I decreases as the display light amount B becomes greater, and becomes a third of the maximum value (33.3%) when the display light amount B is 100%. On the other hand, the luminance Ii increases as the display light amount B becomes greater. Specifically, the luminance Ii becomes a minimum value (0%) when the display light amount B is 0%. The luminance Ii increases as the display light amount B becomes greater, and becomes a third of the maximum value (33.3%) when the display light amount B is 100%.

[Modification 1-2]

Figure 11:
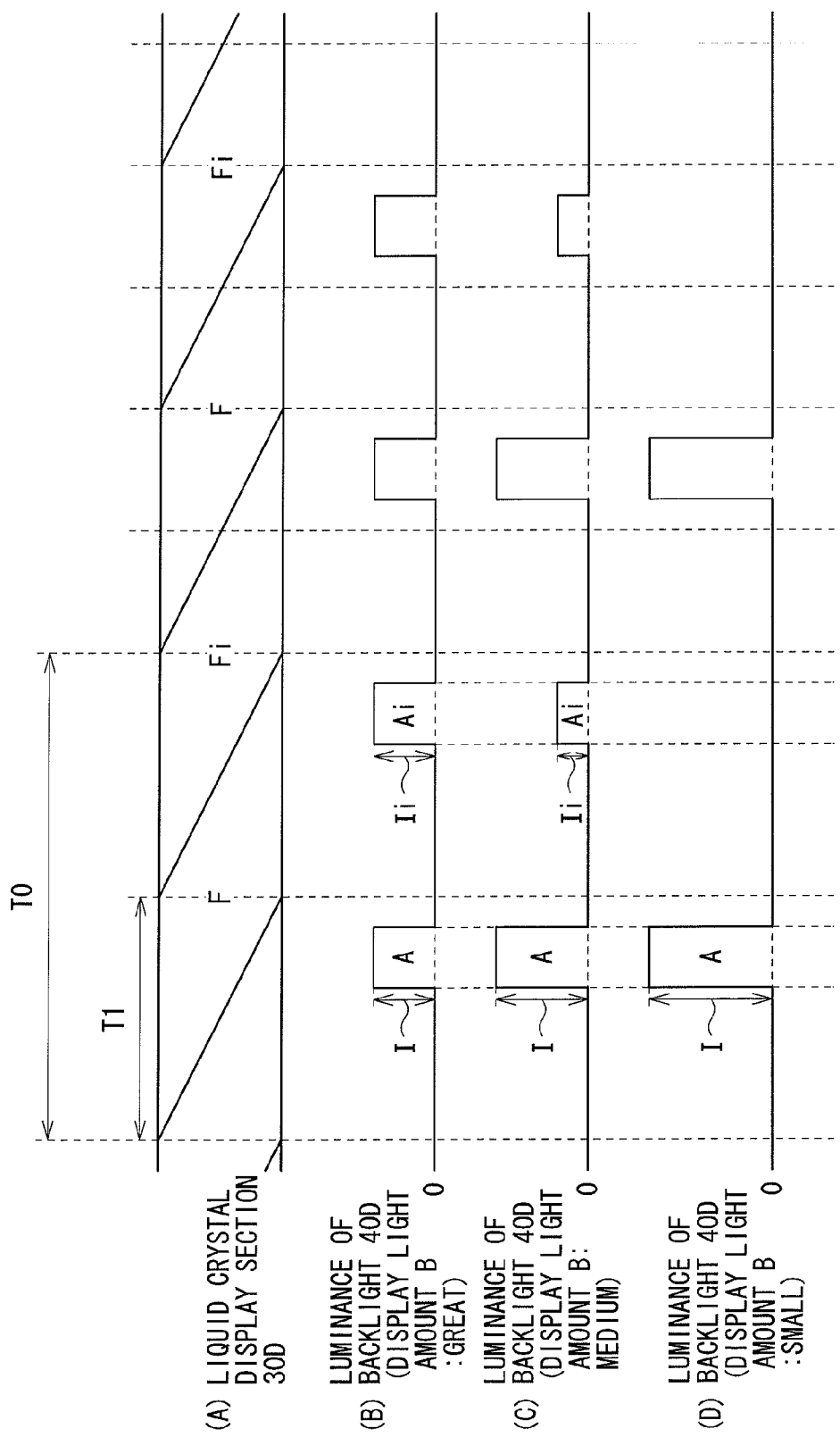
FIG. 11 is a timing waveform diagram showing an operation example of a display unit according to another modification for the first embodiment of the present disclosure.

According to the above-described embodiment of the present disclosure, the liquid crystal display section 30 displays each of the frame image F and the interpolated frame image Fi twice during a timing cycle T0, although it is not limited thereto. Alternatively, as shown in FIG. 11 for example, each of the frame image F and the interpolated frame image Fi may be displayed only one time. In this case, for example, during timing periods t2 to t3 and t6 to t7, an observer views a transient variation in the display image on the liquid crystal display section 30, but this modification is applicable for any applications in which such a deterioration in the image quality is a less concern.

[Modification 1-3]

Figure 12:
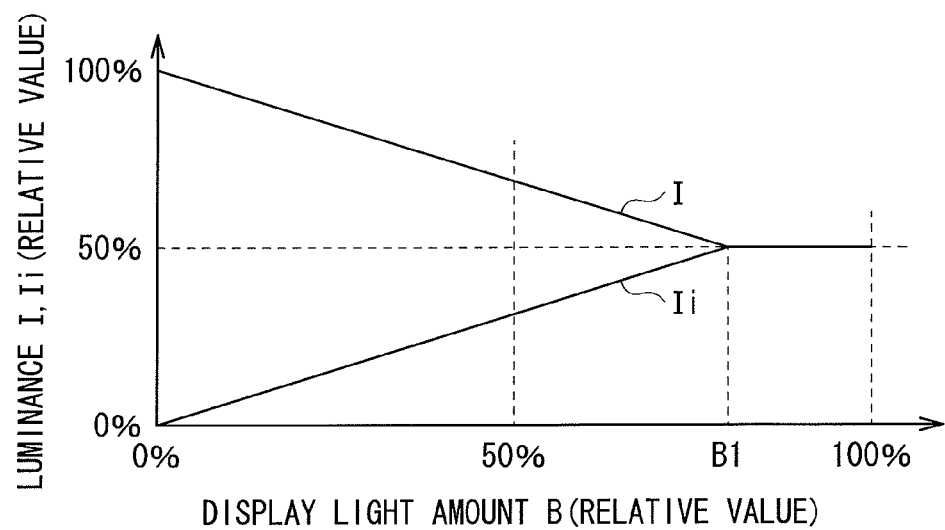
FIG. 12 is a characteristic diagram showing a characteristic example of a backlight driver section according to another modification for the first embodiment of the present disclosure.

According to the above-described embodiment of the present disclosure, as shown in FIG. 6, the backlight driver section 17 controls the backlight 40 to increase the luminance I and decrease the luminance Ii as the display light amount B becomes greater, although it is not limited thereto. Alternatively, as shown in FIG. 12 for example, when the display light amount B increases to or above a given value (B1), the luminance I and the luminance Ii may be kept at constant values (50%). Such a characteristic is applicable for a display unit capable of increasing a total light-emission amount for example. Further, as described above, it depends on various factors such as personal difference whether or not flickering is observed, and thus it is desirable to make a configuration so that a value of the display light amount B1 may be adjustable.

2. Second Embodiment

Next, a display unit 2 according to a second embodiment of the present disclosure is described. The second embodiment configures a display unit using a backlight having a plurality of light emitting sections. It is to be noted that any component parts essentially same as the display unit 1 according to the first embodiment of the present disclosure are denoted with the same reference numerals, and the related descriptions are omitted as appropriate.

Figure 13:
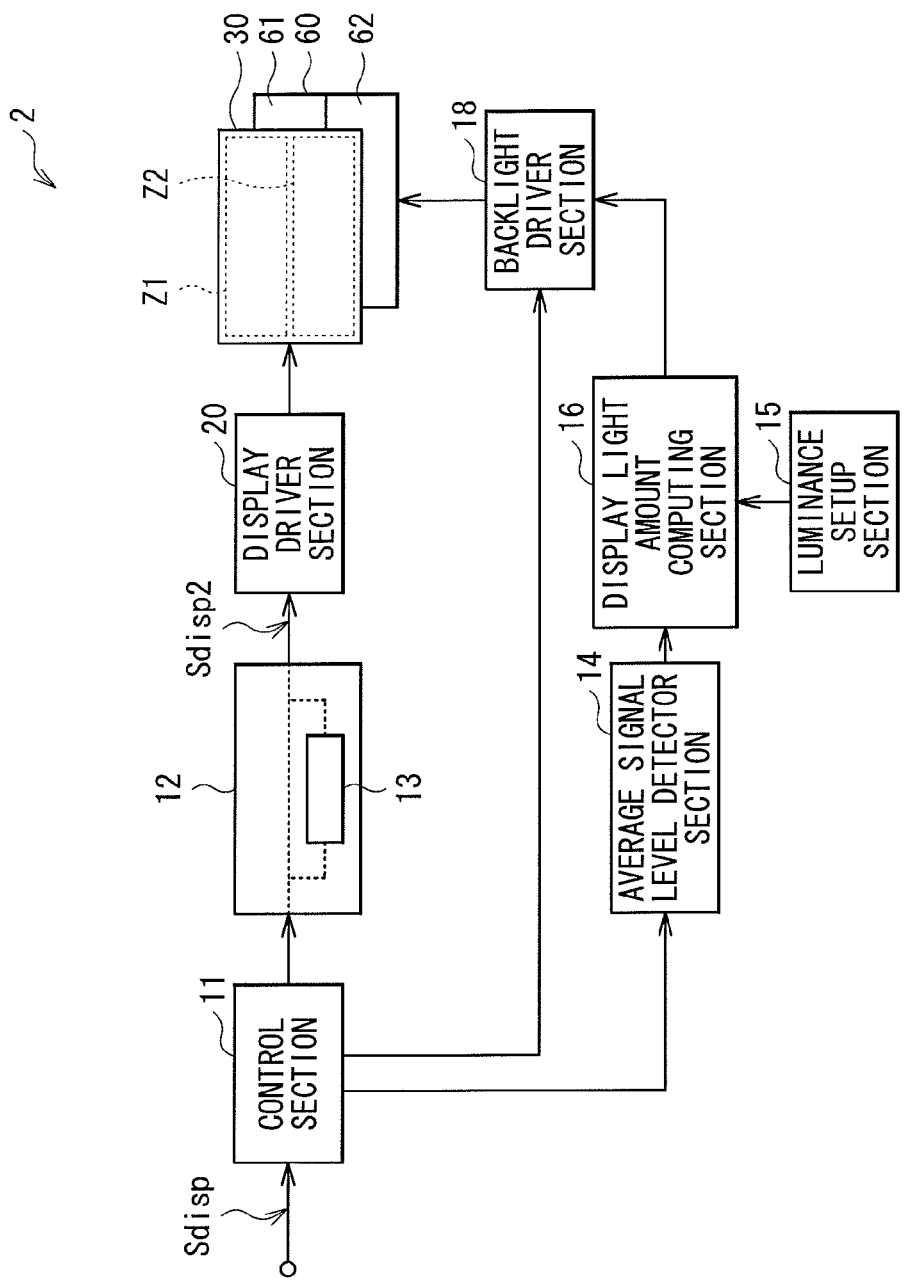
FIG. 13 is a block diagram showing a configuration example of a display unit according to a second embodiment of the present disclosure.

FIG. 13 shows a configuration example of the display unit 2 according to the second embodiment of the present disclosure. The display unit 2 includes a backlight 60 and a backlight driver section 18. The backlight 60 has, in this example, two light emitting sections 61 and 62 that are provided side by side in the sequential line scanning direction. The backlight driver section 18 drives these light emitting sections 61 and 62 independently of each other. Light projected from the light emitting section 61 comes into a corresponding region Z1 on the liquid crystal display section 30, while light projected from the light emitting section 62 comes into a corresponding region Z2 on the liquid crystal display section 30. It is to be noted that, in this example, the backlight 60 has two light emitting sections 61 and 62, although it is not limited thereto. Alternatively, the backlight 60 may have three or more light emitting sections.

Thereupon, the light emitting sections 61 and 62 correspond to a specific example of "light-emitting subsections" in one embodiment of the present disclosure.

Figure 14:
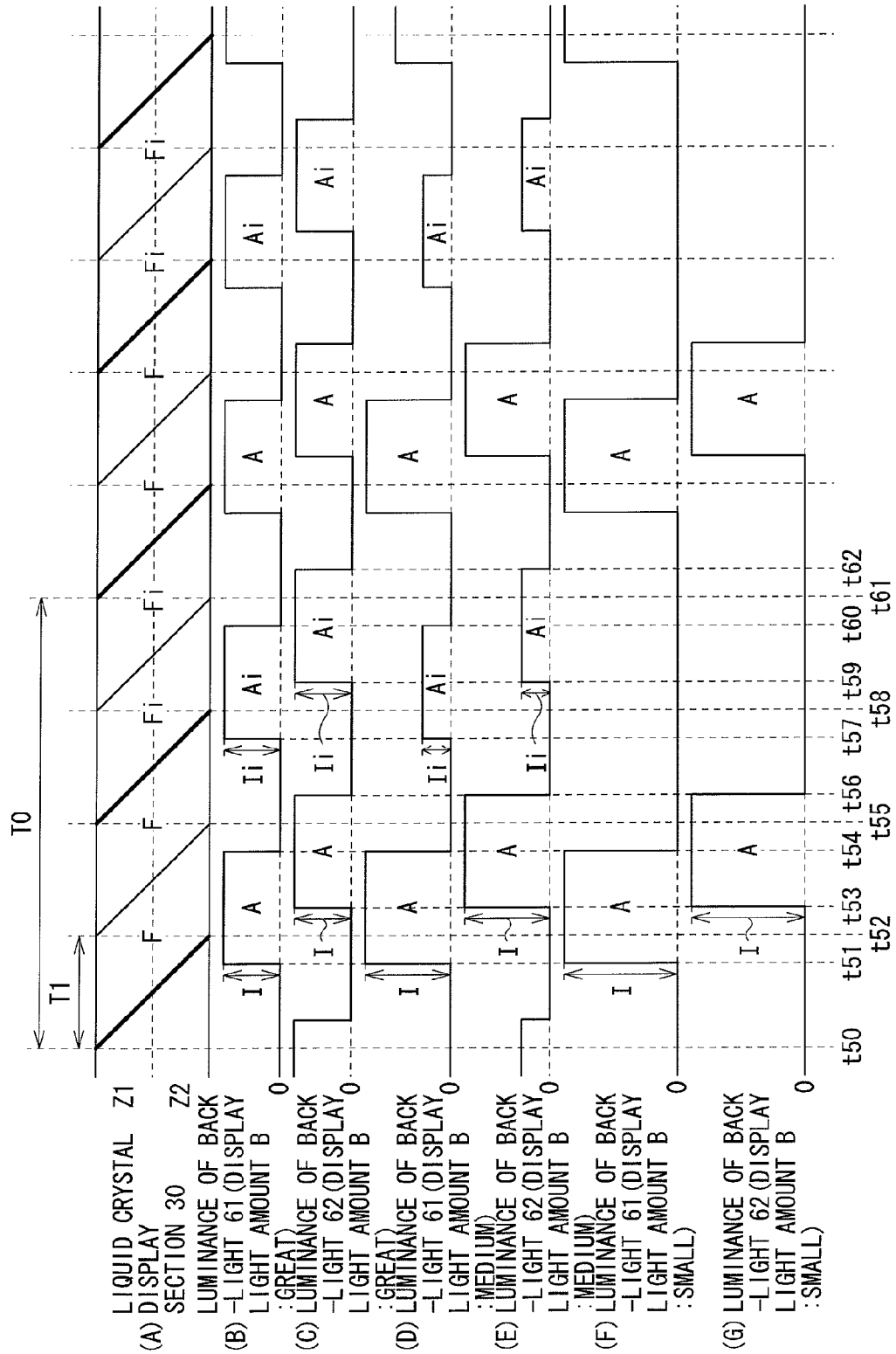
FIG. 14 is a timing waveform diagram showing an operation example of the display unit shown in FIG. 13.

FIG. 14 shows a timing diagram of the display operation for the display unit 2, wherein (A) denotes an operation of the liquid crystal display section 30, while (B) to (G) denote the luminance of the backlight 60. Hereupon, (B) and (C) show the luminance on the light emitting sections 61 and 62 when the display light amount B is great, and (D) and (E) show the luminance on the light emitting sections 61 and 62 when the display light amount B is medium, while (F) and (G) show the luminance on the light emitting sections 61 and 62 when the display light amount B is small.

First, during a timing period t50 to t52, the liquid crystal display section 30 carries out the sequential line scanning from the uppermost part toward the lowermost part to display the frame image F ((A) of FIG. 14). Then, during a timing period t52 to t55, the frame image F is displayed once again ((A) of FIG. 14). Thereafter, during a timing period t51 to t54 after a response of the liquid crystal device LC is almost completed at the region Z1 on the liquid crystal display section 30, the backlight driver section 18 drives the light emitting section 61 to emit light with the luminance I corresponding to the display light amount B ((B), (D), and (F) of FIG. 14). Similarly, during a timing period t53 to t56 after a response of the liquid crystal device LC is almost completed at the region Z2 on the liquid crystal display section 30, the backlight driver section 18 drives the light emitting section 62 to emit light with the luminance I corresponding to the display light amount B ((C), (E), and (G) of FIG. 14).

Next, during a timing period t55 to t58, the liquid crystal display section 30 carries out the sequential line scanning from the uppermost part toward the lowermost part to display the interpolated frame image Fi ((A) of FIG. 14). Then, during a timing period t58 to t61, the interpolated frame image Fi is displayed once again ((A) of FIG. 14). Thereafter, during a timing period t57 to t60 after a response of the liquid crystal device LC is almost completed at the region Z1 on the liquid crystal display section 30, the backlight driver section 18 drives the light emitting section 61 to emit light with the luminance Ii corresponding to the display light amount B ((B), (D), and (F) of FIG. 14). Similarly, during a timing period t59 to t62 after a response of the liquid crystal device LC is almost completed at the region Z2 on the liquid crystal display section 30, the backlight driver section 18 drives the light emitting section 62 to emit light with the luminance Ii corresponding to the display light amount B ((C), (E), and (G) of FIG. 14).

By repeating the above-described operation cycle, the display unit 2 repeats a display of the frame image F and a display of the interpolated frame image Fi alternately.

As described above, according to the second embodiment of the present disclosure, the backlight is divided into two light emitting sections, and these light emitting sections are controlled to emit light independently of one another at a timing synchronized with the sequential line scanning at corresponding regions on the liquid crystal display section. Therefore, as compared with a case where the backlight is not divided, it is possible to reduce variation within a display screen in the time required for the backlight corresponding to each line to emit light after writing of a pixel signal in each line. This allows to reduce a difference in awareness of a transient response of a liquid crystal during such a period as well as to reduce deterioration in the image quality. Further, since a light-emitting period of each light emitting section is allowed to be set up independently, it is possible to extend a light-emitting time of each light emitting section and to increase a light-emission amount. Other advantageous effects are the same as with a case of the first embodiment of the present disclosure.

3. Third Embodiment

Next, a display unit 3 according to a third embodiment of the present disclosure is described. The third embodiment controls the luminance I and the luminance Ii based on not only the display light amount B but also an amount of background-light around the display unit 3. It is to be noted that any component parts essentially same as the display unit 1 according to the first embodiment of the present disclosure are denoted with the same reference numerals, and the related descriptions are omitted as appropriate.

Figure 15:
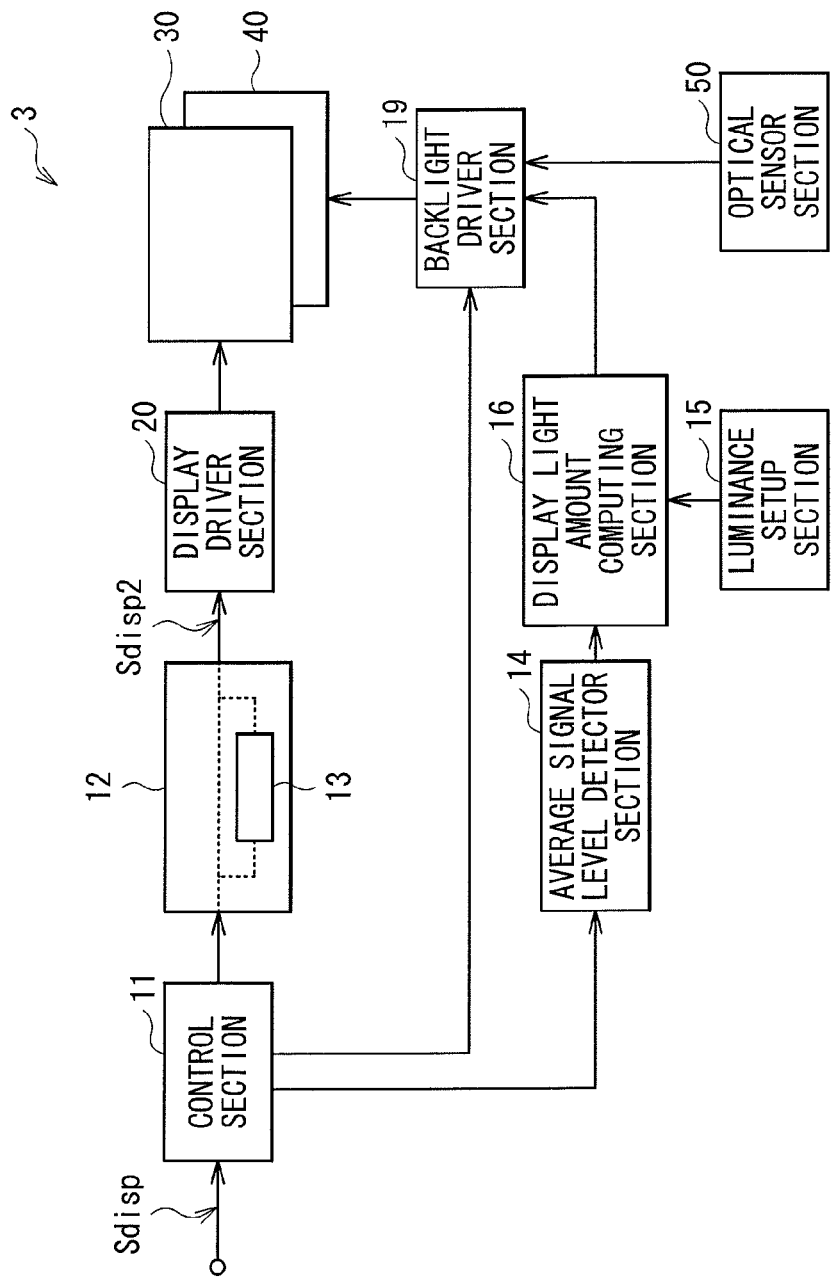
FIG. 15 is a block diagram showing a configuration example of a display unit according to a third embodiment of the present disclosure.

FIG. 15 shows a configuration example of the display unit 3 according to the third embodiment of the present disclosure. The display unit 3 includes an optical sensor section 50 and a backlight driver section 19. The optical sensor section 50 detects an amount of background-light (background-light amount C) around the display unit 3. The backlight driver section 19 controls the luminance I and the luminance Ii of the backlight 40 based on not only the display light amount B determined by the display light amount computing section 16, but also the background-light amount C detected by the optical sensor section 50.

Thereupon, the optical sensor section 50 corresponds to a specific example of a "background-light sensor section" in one embodiment of the present disclosure.

As described above, a flicker detection frequency of a person is changed with brightness of a video viewing environment as well as with brightness of a video image. Specifically, when it is dark around a display unit, the flicker detection frequency increases, which makes a person feel flickering more easily. Consequently, on the display unit 3, when it is dark around the display unit (background-light amount C is small), the backlight driver section 19 decreases the luminance I and increases the luminance Ii, thereby controlling the backlight 40 to operate in a state closer to (B) of FIG. 5 for example. This increases a blinking frequency on the display unit 3, making it possible to reduce the possibilities that an observer may become aware of flickering.

On the other hand, when it is bright around the display unit, the flicker detection frequency decreases on the backlight 40, which makes it difficult for a person to feel flickering. Consequently, on the display unit 3 according to the third embodiment of the present disclosure, when it is bright around the display unit (background-light amount C is great), the backlight driver section 19 increases the luminance I and decreases the luminance Ii, thereby controlling the backlight 40 to operate in a state closer to (D) of FIG. 5 for example. As a result, even if any interpolation error should occur in generating the interpolated frame image Fi in the interpolation processing, it is possible to reduce the possibilities that an observer may become aware of deterioration in the image quality.

Figure 16:
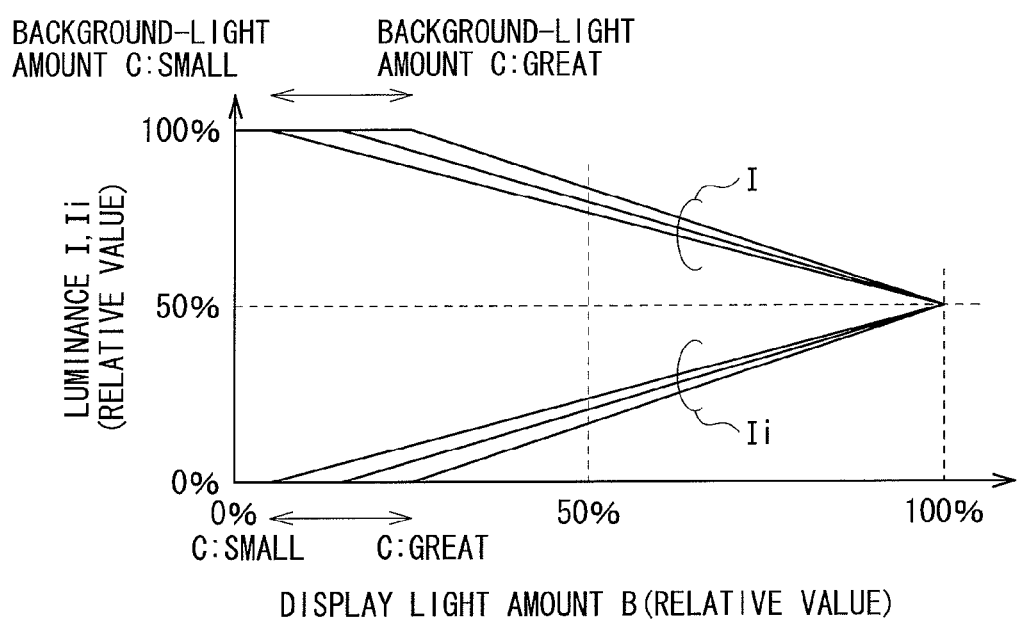
FIG. 16 is a characteristic diagram showing a characteristic example of the backlight driver section shown in FIG. 15.

FIG. 16 shows a characteristic example of the backlight driver section 19. As shown in FIG. 16, the luminance I decreases as the display light amount B becomes greater. At this time, when the background-light amount C is small, the luminance I decreases more smoothly as compared with a case where the background-light amount C is great. When the display light amount B is 100%, the luminance I becomes 50% independently of the background-light amount C. In other words, when the display light amount B is constant, if the background-light amount C is increased, the luminance I increases.

On the contrary, the luminance Ii increases as the display light amount B becomes greater. At this time, when the background-light amount C is small, the luminance Ii increases more smoothly as compared with a case where the background-light amount C is great. When the display light amount B is 100%, the luminance Ii becomes 50% independently of the background-light amount C. In other words, when the display light amount B is constant, if the background-light amount C is increased, the luminance I decreases.

On the display unit 3, therefore, when the background-light amount C is small, it is possible to reduce the possibilities that an observer may feel flickering. When the background-light amount C is great, even if any interpolation error should occur in generating the interpolated frame image, it is possible to reduce the possibilities that an observer may become aware of deterioration in the image quality.

As described above, according to the third embodiment of the present disclosure, the luminance I and the luminance Ii are controlled based on not only the display light amount but also the background-light amount, which makes it possible to further improve the image quality. Other advantageous effects are the same as with a case of the first embodiment of the present disclosure.

[Modification 3]

According to the third embodiment of the present disclosure, the backlight driver section 19 controls the luminance I and the luminance Ii based on both of the display light amount B and the background-light amount C, although it is not limited thereto. Alternatively, the luminance I and the luminance Ii may be controlled based on only the background-light amount C.

The present technology is described with reference to some embodiments and modifications, but the present technology is not limited to those embodiments and the like, and various variations are available.

Figure 17:
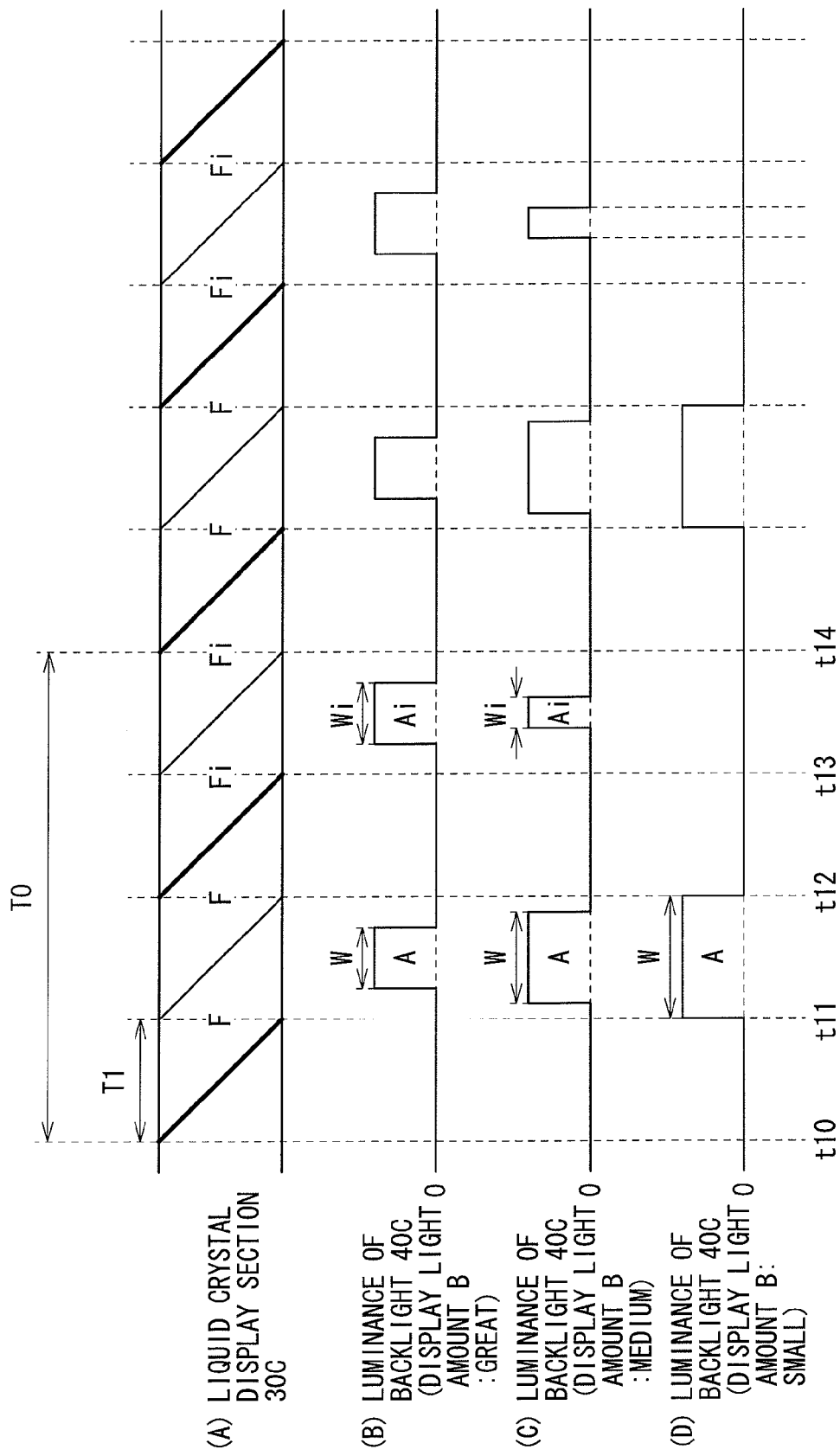
FIG. 17 is a timing waveform diagram showing an operation example of a display unit according to a modification.

For example, in the above-described embodiments and the like, the backlight driver section controls the light-emission amounts A and Ai based on the luminance I and the luminance Ii, but not limited to this. Alternatively, as shown in FIG. 17 for example, the light-emission amounts A and Ai may be controlled based on light-emitting times W and Wi. In changing the light-emitting times W and Wi, as shown in FIG. 17, it is desirable to perform a control to keep a center timing of each light-emitting period. As a result, any timing for displaying the frame image F and the interpolated frame image Fi is not changed due to the display light amount B or the like, and it is possible to reduce the possibilities that an observer may become aware of deterioration in the image quality. Further, a control based on the luminance that is described in the above-described embodiments and a control based on the light-emitting times that is described in this modification may be used in combination.

Further, for example, even in the second and third embodiments and the like, two or more pieces of interpolated frame images Fi may be generated based on the adjacent frame image F as with the modification 1-1 of the first embodiment of the present disclosure. In addition, each of the frame image F and the interpolated frame image Fi may be displayed one time respectively during a timing cycle T0 as with the modification 1-2 of the first embodiment of the present disclosure. Moreover, the luminance I and the luminance Ii may be set up to be constant values (50%) when the display light amount B increases to or above a given value (B1), and a value of this display light amount B1 may be adjustable as with the modification 1-3 (FIG. 12) of the first embodiment of the present disclosure.

Further, for example, in the above-described embodiments and the like, the liquid crystal display section 30 and the backlight 40 are used, but is not limited to this. Alternatively, for example, a CRT (Cathode Ray Tube) display unit, an EL (Electro Luminescence) display unit, and an LED display unit using LEDs as display devices may be used. As an example, a case where an EL display section is used instead of the liquid crystal display section 30 and the backlight 40 in the first embodiment of the present disclosure is described hereinafter.

Figure 18:
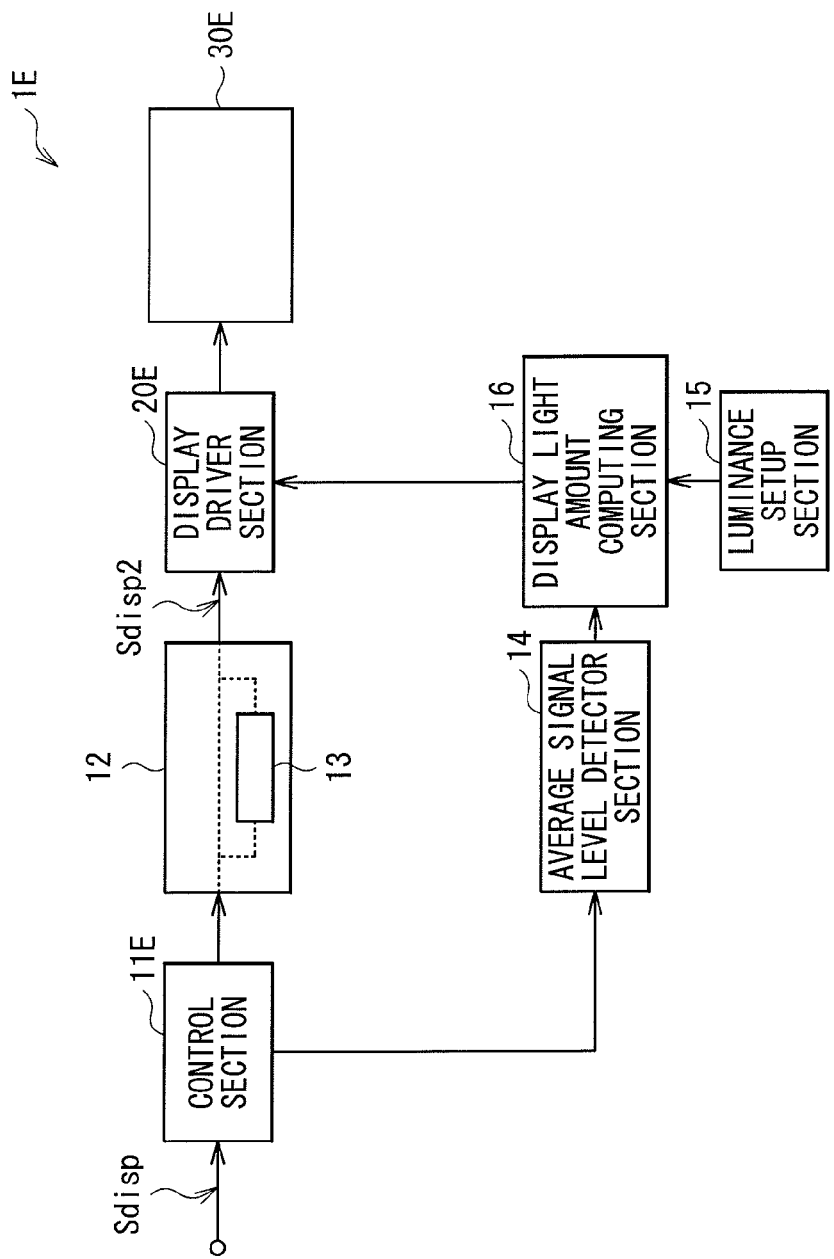
FIG. 18 is a block diagram showing a configuration example of a display unit according to another modification.

FIG. 18 shows a configuration example of a display unit 1E according to this modification. The display unit 1E includes a control section 11E, a display driver section 20E, and an EL display section 30E. The control section 11E is a circuit that is based on a video signal Sdisp for controlling the interpolation processing section 12 and the average signal level detector section 14 to operate in synchronization with each other. The display driver section 20E drives the EL display section 30E in accordance with a video signal Sdisp2 provided from the interpolation processing section 12 and a computing result of the display light amount B that is provided from the display light amount computing section 16. Specifically, the display driver section 20E drives the EL display section 30E to add an offset light-emission amount to the light-emission amount corresponding to each image information in displaying the frame image F and the interpolated frame image Fi. At this time, the display driver section 20E controls the offset light-emission amount in displaying the frame image F and the offset light-emission amount in displaying the interpolated frame image Fi independently. The EL display section 30E is formed of an EL display device, and an organic EL device is applicable for example. Thereupon, the display driver section 20E corresponds to a specific example of a "display control section" in one embodiment of the present disclosure.

It is possible to achieve at least the following configurations from the example embodiments and the example modifications of the present technology described above.

(1) A display unit, including:
a liquid crystal display section displaying a series of original frame images and a series of interpolated frame images in a time-divisional manner, the interpolated frame images being generated based on the original frame images;
a backlight emitting light intermittently; and
a backlight control section controlling a first light-emission amount and a second light-emission amount of the backlight independently of each other, the first light-emission amount being an amount during a first period corresponding to a period for displaying the original frame images, and the second light-emission amount being an amount during a second period corresponding to a period for displaying the interpolated frame images.

(2) The display unit according to (1), further including a computing section determining, based on each of the original frame images, an amount of display light to be projected from a display surface of the liquid crystal display section in response to display of the original frame images on the liquid crystal display section,
wherein the backlight control section controls the first light-emission amount and the second light-emission amount based on the amount of display light obtained by the computing section.

(3) The display unit according to (2), wherein the backlight control section decreases the first light-emission amount and increases the second light-emission amount when the amount of display light is increased, and increases the first light-emission amount and decreases the second light-emission amount when the amount of display light is decreased.

(4) The display unit according to any one of (1) to (3), wherein the backlight control section allows the first light-emission amount and the second light-emission amount to be varied gradually over a plurality of frame cycle periods.

(5) The display unit according to any one of (1) to (4), wherein the backlight control section controls a sum of the first light-emission amount and the second light-emission amount to be maintained constant.

(6) The display unit according to any one of (1) to (5), wherein the first light-emission amount is equal to, or greater than the second light-emission amount.

(7) The display unit according to any one of (1) to (6), wherein the backlight control section controls the first light-emission amount and the second light-emission amount based on a luminance magnitude of the backlight.

(8) The display unit according to any one of (1) to (7), wherein the backlight control section controls the first light-emission amount and the second light-emission amount based on a length of the first period and a length of the second period, respectively.

(9) The display unit according to any one of (1) to (8), further including a background-light sensor section detecting an amount of background-light around the display unit,
wherein the backlight control section controls the first light-emission amount and the second light-emission amount based on the amount of background-light obtained by the background-light sensor section.

(10) The display unit according to (9), wherein the backlight control section increases the first light-emission amount and decreases the second light-emission amount when the amount of background-light is increased, and increases the first light-emission amount and decreases the second light-emission amount when the amount of background-light is decreased.

(11) The display unit according to any one of (1) to (10), wherein
the backlight has a plurality of light-emitting subsections, and
the backlight control section controls the first light-emission amount and the second light-emission amount independently of each other, for each of the light-emitting subsections.

(12) The display unit according to any one of (1) to (11), further including an interpolated image generating section generating the series of interpolated frame images based on the series of original frame images.

(13) A display unit, including:
a display section displaying a series of original frame images and a series of interpolated frame images in a time-divisional manner, the interpolated frame images being generated based on the original frame images; and
a display control section controlling the display section to allow a light-emission amount of the display section during a period for displaying the original frame images to be a first total light-emission amount, and controlling the display section to allow a light-emission amount of the display section during a period for displaying the interpolated frame images to be a second total light-emission amount, the first total light-emission amount being defined as a sum of a first basic light-emission amount corresponding to image information of the original frame images and a first offset light-emission amount, the second total light-emission amount being defined as a sum of a second basic light-emission amount corresponding to image information of the interpolated frame images and a second offset light-emission amount,
wherein the display control section controls the first offset light-emission amount and the second offset light-emission amount independently of each other.

(14) A method of displaying, including:
displaying, on a liquid crystal display section, a series of original frame images and a series of interpolated frame images in a time-divisional manner, the interpolated frame images being generated based on the original frame images; and
allowing a backlight to emit light intermittently, the allowing the backlight to emit the light intermittently including controlling a first light-emission amount and a second light-emission amount of a backlight independently of each other, the first light-emission amount being an amount during a first period corresponding to a period for displaying the original frame images, and the second light-emission amount being an amount during a second period corresponding to a period for displaying the interpolated frame images.

It should be understood by those skilled in the art that various modifications, combinations, sub-combinations and alterations may occur depending on design requirements and other factors insofar as they are within the scope of the appended claims or the equivalents thereof.

What is claimed is:

1. A display unit, comprising:
a liquid crystal display section displaying a series of original frame images and a series of interpolated frame images in a time-divisional manner, the interpolated frame images being generated based on the original frame images;
a backlight emitting light intermittently;
a backlight control section controlling a first light-emission amount and a second light-emission amount of the backlight independently of each other, the first light-emission amount being an amount during a first period corresponding to a period for displaying the original frame images, and the second light-emission amount being an amount during a second period corresponding to a period for displaying the interpolated frame images; and
a computing section determining, based on each of the original frame images, an amount of display light to be projected from a display surface of the liquid crystal display section in response to display of the original frame images on the liquid crystal display section,
wherein the backlight control section controls the first light-emission amount and the second light-emission amount based on the amount of display light obtained by the computing section, and
wherein the backlight control section decreases the first light-emission amount and increases the second light-emission amount when the amount of display light is increased, and increases the first light-emission amount and decreases the second light-emission amount when the amount of display light is decreased.

2. The display unit according to claim 1, wherein the backlight control section allows the first light-emission amount and the second light-emission amount to be varied gradually over a plurality of frame cycle periods.

3. The display unit according to claim 1, wherein the backlight control section controls a sum of the first light emission amount and the second light-emission amount to be maintained constant.

4. The display unit according to claim 1, wherein the first light-emission amount is equal to, or greater than the second light-emission amount.

5. The display unit according to claim 1, wherein the backlight control section controls the first light-emission amount and the second light-emission amount based on a luminance magnitude of the backlight.

6. The display unit according to claim 1, wherein the backlight control section controls the first light-emission amount and the second light-emission amount based on a length of the first period and a length of the second period, respectively.

7. The display unit according to claim 1, further comprising a background-light sensor section detecting an amount of background-light around the display unit,
wherein the backlight control section controls the first light-emission amount and the second light-emission amount based on the amount of background-light obtained by the background-light sensor section.

8. The display unit according to claim 7, wherein the backlight control section increases the first light-emission amount and decreases the second light-emission amount when the amount of background-light is increased, and decreases the first light-emission amount and increases the second light emission amount when the amount of background-light is decreased.

9. The display unit according to claim 1, wherein
the backlight has a plurality of light-emitting subsections, and
the backlight control section controls the first light emission amount and the second light-emission amount independently of each other, for each of the light-emitting subsections.

10. The display unit according to claim 1, further comprising an interpolated image generating section generating the series of interpolated frame images based on the series of original frame images.

11. A display unit, comprising:
a display section displaying a series of original frame images and a series of interpolated frame images in a time divisional manner, the interpolated frame images being generated based on the original frame images;
a backlight emitting light intermittently;
a display control section controlling a light-emission amount of the backlight during a period for displaying the original frame images to be a first total light-emission amount, and controlling a light-emission amount, and controlling of the backlight during a period for displaying the interpolated frame images to be a second total light emission amount, the first total light-emission amount being defined as a sum of a first basic light-emission amount corresponding to image information of the original frame images and a first offset light-emission amount, the second total light-emission amount being defined as a sum of a second basic light-emission amount corresponding to image information of the interpolated frame images and a second offset light-emission amount; and
a computing section determining, based on each of the original frame images, an amount of display light to be projected from a display surface of the display section in response to display of the original frame images on the display section, wherein the display control section controls the first offset light-emission amount and the second offset light-emission amount independently of each other and based on the amount of display light obtained by the computing section, and wherein the display control section decreases the first offset light-emission amount and increases the second offset light-emission amount when the amount of display light is increased, and increases the first offset light-emission amount and decreases the second offset light-emission amount when the amount of display light is decreased.

12. A method of displaying, comprising:

displaying, on a liquid crystal display section, a series of original frame images and a series of interpolated frame images in a time-divisional manner, the interpolated frame images being generated based on the original frame images;

allowing a backlight to emit light intermittently, the allowing the backlight to emit the light intermittently including controlling a first light-emission amount and a second light-emission amount of a backlight independently of each other, the first light-emission amount being an amount during a first period corresponding to a period for displaying the original frame images, and the second light-emission amount being an amount during a second period corresponding to a period for displaying the interpolated frame images; and increasing the first light-emission amount and decreasing the second light-emission amount when an amount of background-light around the liquid crystal display section is increased, and decreasing the first light-emission amount and increasing the second light-emission amount when the amount of background-light is decreased.

* * * * *